No. 610,853. Patented Sept. 13, 1898.
A. I. SANDBO.
ATTACHMENT FOR COFFEE POTS.
(Application filed Nov. 30, 1897.)
(No Model.)
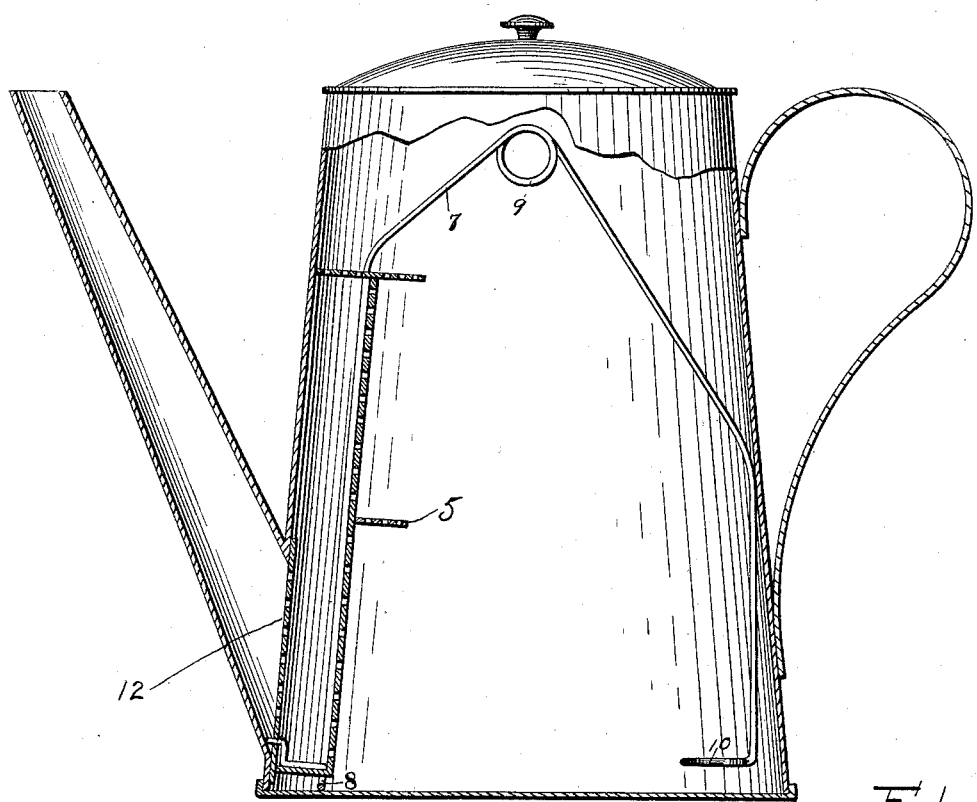
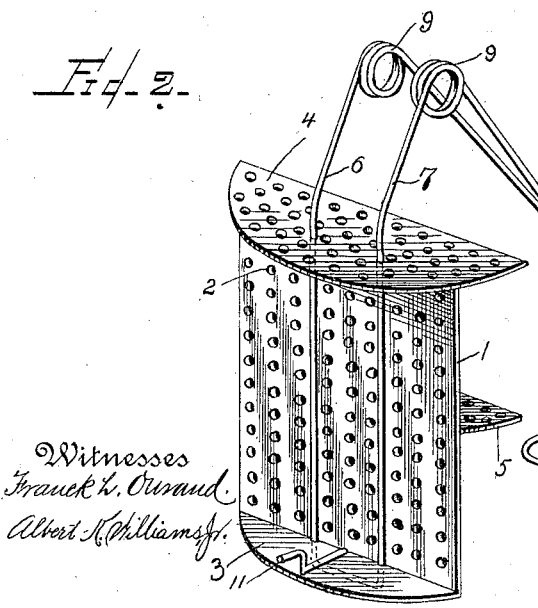
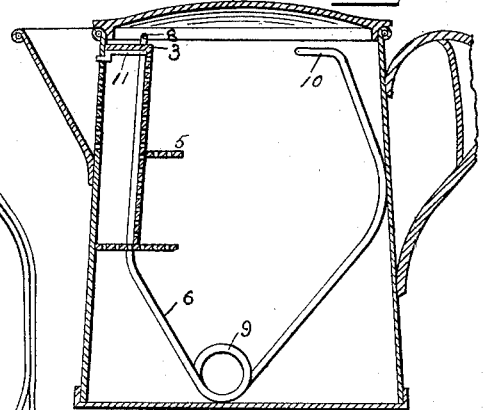
Witnesses
Franck L. Durand
Albert K. Williams Jr.
Inventor
Anton I. Sandbo.
By W. F. FitzGerald
Attorneys
THE NORRIS PETERS CO., PHOTO-LITHO., WASHINGTON, D. C.

UNITED STATES PATENT OFFICE.

ANTON I. SANDBO, OF WAUKON, IOWA.

ATTACHMENT FOR COFFEE-POTS.

SPECIFICATION forming part of Letters Patent No. 610,853, dated September 13, 1898.

Application filed November 30, 1897. Serial No. 660,243. (No model.)

*To all whom it may concern:*

Be it known that I, ANTON I. SANDBO, a citizen of the United States, residing at Waukon, in the county of Allamakee and State of Iowa, have invented certain new and useful Improvements in Attachments for Coffee-Pots; and I do hereby declare the following to be a full, clear, and exact description of the invention, such as will enable others skilled in the art to which it appertains to make and use the same.

My invention, which will be fully described in the following specification and illustrated in the accompanying drawings, relates to certain new and useful improvements in coffee-pot attachments, which while more especially applicable to coffee-pots will be found desirable when used in connection with a teapot or other vessel within which it is desirable to confine the leaves or parts of the coffee-berry and prevent the same from passing out with the liquid.

The object of my invention, therefore, is to enable the coffee-grounds or the leaves employed, respectively, in coffee and tea making to be wholly confined within the body of the vessel, permitting the liquid extract or decoction to pass freely out of the usual nozzle or spout provided therefor.

My invention, as will be hereinafter made fully apparent, may be cheaply and expeditiously manufactured as a complete article within itself designed to fit within the vessel employed for making coffee, tea, or the like and reliably perform its office of straining the liquid and retaining the "grounds" or leaves, as the case may be. The device may be readily placed in position or removed for the purpose of cleaning the vessel and removing the accumulated sediment.

In the accompanying drawings, Figure 1 is a side elevation of one form of vessel having the sides thereof broken away and showing the strainer apparatus in section. Fig. 2 is a perspective detail of the strainer apparatus separated from the vessel. Fig. 3 is a vertical sectional view on a slightly-reduced scale, showing my strainer apparatus applied to use upon a coffee-pot, the position of the device being reversed from that shown in Fig. 1.

In materializing my invention I provide the main section or body 1, having a series of perforations 2 throughout its entire surface, said perforations being of sufficient size to prevent coffee-grounds or tea-leaves from passing through, it being understood that this part of the device may be made of closely or coarsely woven wire-cloth.

To the lower end of the body 1, as the device is illustrated in Figs. 1 and 2, I firmly secure or integrally form therewith the crescent-shaped section 3, designed to fit snugly in contact with the side of the vessel, while to the upper end of the body 1, as illustrated in Figs. 1 and 2, or to the lower end, as shown in Fig. 3, I secure, in any preferred way, the crescent-shaped section 4, also perforated throughout its surface, or said section may be wholly formed of closely-woven wire-cloth. Preferably located intermediate the body-section 1 is the dam-section 5, also perforated throughout its surface or formed of cloth, designed to check the upward rise of the leaves or fragments of the coffee-bean or other subject-matter treated, and thus tend to confine the same in the lower portion of the vessel, permitting the upper portion of the body 1 to be unimpeded or clogged, as will be the case if the sediment raised too high.

In order to reliably anchor the strainer device just described in its operative position over the usual perforated plate located at the inner end of the nozzle or spout, I provide the resilient arms 6 and 7, each permanently connected with each other by the looped section 8 and also attached to the body-section 1 and the upper and lower crescent-shaped sections. After leaving the straining apparatus both of said arms pass upward and are provided with the coiled or looped sections 9. After the looped sections 9 are formed the wires pass downward at an angle sufficient to throw them into engagement with the side of the vessel, when they terminate in the loop 10, designed, when the device is used as shown in Fig. 3, to facilitate the removal of the strainer apparatus, and also to secure the dam in position by means of the resiliency provided by the coiled sections 9, no matter whether the device is applied to use as shown in Figs. 1 and 2 or as illustrated in Fig. 3.

In order to provide additional means for holding the strainer apparatus in position, I provide the anchoring-stem 11, preferably permanently attached to the section 3, the free end thereof being designed to take into one of the usual apertures provided in the perforated plate 12 usually found in all vessels of this kind.

While I have illustrated the preferred form of construction to be observed in producing my improved straining apparatus, it will be understood that any substantial equivalent thereof is comprehended by me, and while I have shown the strainer apparatus proper to be formed of perforated sheet metal it will be clearly apparent, as above stated, that the parts forming the same may be formed of closely or coarsely woven wire-cloth suitably secured into the relationship set forth.

The use of my improved strainer apparatus may be stated to be as follows: In case the spout or nozzle of the vessel employed terminates near the bottom thereof the strainer apparatus is so disposed that it will occupy the position illustrated in Figs. 1 and 2; but, as in the case of the ordinary coffee-pot, when the nozzle or spout terminates in the upper section of the body of the vessel the strainer apparatus will be disposed as shown in Fig. 3, all of which will be clearly apparent. The entire device may be readily removed from the vessel for any purpose and as easily replaced in its operative position. When the device is used as shown in Fig. 3, the loops 8 and 10 form convenient handles by which the device may be easily removed and replaced in position.

Having thus fully described the construction and use of my improved straining apparatus, what I claim as new, and desire to secure by Letters Patent, is—

1. The combination with a suitable vessel, of the herein-described straining apparatus, consisting of a perforated or meshed body, formed substantially as described, said body being provided with resilient arms designed to extend into engagement with the opposite sides of the vessel, and an anchoring-point secured to said body and designed to engage with one of the perforations in the usual spout-strainer, whereby the straining apparatus is held against vertical or lateral movement, substantially as specified and for the purpose set forth.

2. As a new article of manufacture, the herein-described strainer apparatus for coffee-pots or the like consisting of a perforated or meshed body having end sections formed to fit the curved sides of the vessel to which it is applied and further provided with a perforated intermediate dam-section and with resilient arms designed to hold the body in an adjusted position, said body being further provided with an anchoring-stem designed to take into one of the perforations provided in the vessel, all formed substantially in the manner and for the purpose set forth.

In testimony whereof I affix my signature in presence of two witnesses.

ANTON I. SANDBO.

Witnesses:
 A. C. LARSON,
 H. J. BENTLEY.